United States Patent
Wagner et al.

(10) Patent No.: US 6,846,854 B2
(45) Date of Patent: Jan. 25, 2005

(54) MICROENCAPSULATED RED PHOSPHORUS

(75) Inventors: Michael Wagner, Moers (DE);
Wolfgang Podszun, Köln (DE);
Henricus Peerlings, Solingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 228 days.

(21) Appl. No.: 10/155,043

(22) Filed: May 24, 2002

(65) Prior Publication Data

US 2002/0188048 A1 Dec. 12, 2002

(30) Foreign Application Priority Data

Jun. 1, 2001 (DE) ......................................... 101 26 760

(51) Int. Cl.$^7$ ................................................ C08K 9/12
(52) U.S. Cl. ........................ 523/210; 523/205; 524/414; 524/492
(58) Field of Search .......................... 523/210; 524/414, 524/492, 493, 430

(56) References Cited

U.S. PATENT DOCUMENTS

| 3,778,407 A | 12/1973 | Hild et al. ................ 260/37 N |
| 4,242,240 A | 12/1980 | Cerny et al. .................. 260/14 |
| 4,440,880 A | 4/1984 | Albanesi et al. ............. 523/205 |
| 4,698,215 A | * 10/1987 | Albanesi et al. ............. 423/274 |
| 4,853,288 A | * 8/1989 | Staendeke et al. ..... 428/402.24 |
| 5,041,490 A | * 8/1991 | Sakon et al. ................. 524/414 |
| 5,543,444 A | * 8/1996 | Kobayashi et al. ......... 523/205 |

FOREIGN PATENT DOCUMENTS

| DE | 196 19 701 | 11/1996 |
| EP | 0 763 566 | 3/1997 |
| WO | 87/00187 | 1/1987 |

* cited by examiner

Primary Examiner—Katarzyna Wyrozebski
(74) Attorney, Agent, or Firm—Godfried R. Akorli; Diderico van Eyl

(57) ABSTRACT

A method for preparing encapsulated red phosphorus is disclosed. The method entails obtaining a material system that contains dispersed particulate red phosphorus having a mean particle size of 0.1 to 100 μm in an aqueous phase that comprise urea, formaldehyde and a water-soluble silicon dioxide precursor, adding to the material system a sufficient amount of acid to lower the pH to 0 to 5 and maintaining the resulting acidic system at a temperature of 80 to 120° C. for a period longer than one hour. The encapsulated red phosphorus of the invention is suitable for using as a flame retarding agent for plastics molding compositions.

11 Claims, No Drawings

MICROENCAPSULATED RED PHOSPHORUS

FIELD OF THE INVENTION

The present invention relates to red phosphorus and more particularly a microencapsulated red phosphorus.

SUMMARY OF THE INVENTION

A method for preparing encapsulated red phosphorus is disclosed. The method entails obtaining a material system that contains dispersed particulate red phosphorus having a mean particle size of 0.1 to 100 μm in an aqueous phase that comprise urea, formaldehyde and a water-soluble silicon dioxide precursor, adding to the material system a sufficient amount of acid to lower the pH to 0 to 5 and maintaining the resulting acidic system at a temperature of 80 to 120° C. for a period longer than one hour. The encapsulated red phosphorus of the invention is suitable for using as a flame retarding agent for plastics molding compositions.

BACKGROUND OF THE INVENTION

It has been known for a long time to use finely ground red phosphorus to give plastics materials a flame retardant finish. Thus, DE-A-1 931 387 describes self-extinguishing, fibreglass-reinforced polyamides which contain red phosphorus as flame retardant. In addition to its freedom from halogen, red phosphorus has further advantages, for example over halogen compounds as flame retardant such as the smaller quantity required and no or significantly reduced impairment of the mechanical and electrical properties of the plastics materials provided therewith.

However, the processing of red phosphorus is more difficult from the safety point of view. Red phosphorus in a very fine distribution is highly inflammable. At elevated temperature in the presence of moisture and atmospheric oxygen it forms highly toxic phosphorus hydride which is spontaneously inflammable in air.

Many attempts have been made to reduce the problems which occur during the processing of finely divided red phosphorus.

The stabilisation of red phosphorus by precipitation of a shell from silicon dioxide is described in DE-A 19 619 701.

Red phosphorus with a phenyl formaldehyde resin shell is known from DE-A 2 625 673.

EP-A 052 217 describes a method for stabilising red phosphorus by encapsulation with melamine resin.

The encapsulation of flame retardants, including red phosphorus, with a urea resorcinol formaldehyde membrane is described in WO 87/00187.

A stabilised powder of red phosphorus in which the particles are coated with a first shell made of aluminium hydroxide and a second shell made of urea melamine phenyl formaldehyde resin is described in EP-A 195 131. In this complex encapsulation process, the shells have to be applied in separate operations.

Although methods for the microencapsulation of red phosphorus and the products obtained by these methods have already been described, a large amount of phosphine is still liberated. Known microencapsulated products also have the drawback that the mechanical strength of the shell is not always adequate. As a result, the shell of a microencapsulated product is damaged by mechanical stresses which may occur in conveyors and metering devices, so the red phosphorus is no longer adequately protected.

DETAILED DESCRIPTION OF THE INVENTION

A particulate microencapsulated red phosphorus with improved mechanical strength and reduced liberation of phosphine has accordingly been found, forms the subject of the present invention and is characterized in that the capsule wall consists of a shell made of a combination of urea formaldehyde resin and silicon oxide.

A further advantage of the present invention is that encapsulation may be carried out in one step without the isolation of intermediate stages.

The invention also relates to a method of microencapsulating red phosphorus in an aqueous suspension which is characterized in that urea formaldehyde resin and silicon dioxide are produced in a one-pot reaction from water-soluble precursors in the presence of red phosphorus dispersed in water by pH reduction.

The microencapsulated red phosphorus according to the invention is eminently suitable for giving plastic materials a flame retardant finish. It is easy to process and readily compatible with conventional plastics materials. It may be incorporated particularly safely and easily into the thermoplastic materials under conventional plastics processing conditions.

The microencapsulated red phosphorus of the invention refer to particles having a core/shell structure. The proportion by weight of the phosphorus core is 50 to 99 wt. %, preferably 75 to 95 wt. %, the proportion of the shell 1 to 50%, preferably 5 to 25 wt. %. The ratio of urea formaldehyde resin to silicon dioxide in the shell is 95:5 to 5:95, preferably 90:10 to 10:90, particular preferably 80:20 to 20:80.

"Red phosphorus" refers in this context to any colored allotropic forms of phosphorus in finely divided form. The particles have a mean size of 0.1 to 100, preferably 0.2 to 50 and particularly preferably 0.5 to 25 μm. The particle size of the phosphorus may be adjusted by grinding, particularly by wet grinding with a ball or bead mill. A suitable grinding medium is either water or organic solvents such as toluene, mineral oil, dimethylformamide, dimethylacetamide or formic acid.

According to the invention, urea formaldehyde resin is a water-insoluble resin formed by condensation of urea and formaldehyde and optionally further condensable components: melamine, hexamethylene tetramine and phenols, in particular resorcinol.

In the context of the present invention, the term silicon dioxide includes water-insoluble silicon dioxide, silicates, siloxanes and also water-insoluble silicon-oxygen compounds containing OH groups.

The shell according to the invention may contain further components such as pigments and stabilizers in addition to urea formaldehyde resin and silicon dioxide. Thus, a content of titanium dioxide which is a markedly covering white pigment may cover the red inherent color of the phosphorus to a certain extent.

The microencapsulated red phosphorus according to the invention is produced by dispersing particulate red phosphorus, with a mean particle size preferably of 0.1 to 100 μm, in an aqueous phase containing urea, formaldehyde and optionally one or more of the above-mentioned further condensable components as well as a water-soluble silicon dioxide precursor at a pH of 6 to 13, after which the pH is reduced to 0 to 5 by adding a strong acid. Suitable water-soluble silicon dioxide precursors include alkali silicates as well as waterglass, in particular sodium waterglass and potassium waterglass. Furthermore, partially hydrolyzed tetraalkoxysilanes such as tetramethoxysilane and tetraethoxysilane may preferably be used. Any strong acids, in particular sulphuric acid, phosphoric acid and hydrochloric acid are suitable for adjusting the acidic pH. Dispersion and addition of acid may be carried out, for example, in a temperature range of 10 to 90° C., preferably 15 to 60° C., particularly preferably at ambient temperature. After the addition of acid, the reaction mixture is kept at an elevated temperature preferably of 80 to 120° C. for a few hours.

The microencapsulated red phosphorus may easily be isolated from the suspension by sedimentation or filtering. Washing with water or alcohol, may be used for further cleaning.

It is thus advantageous to carry out conditioning, for example at 100 to 200° C., after encapsulation. During conditioning, the condensation reaction is completed and the content of OH groups in the silicon dioxide reduced. It is possible to condition to powder directly. However, tempering may also be carried out in a high-boiling carrier liquid, for example in diphenyl ether or in a mineral oil.

The microencapsulated red phosphorus according to the invention may be handled easily and safely. It does not tend to liberate phosphine. These properties are retained even after being subjected to mechanical stress, for example after transportation in conveyors or metering devices.

The microencapsulated red phosphorus according to the invention is eminently suitable for flameproofing plastics or blends of two or more different plastics. These include thermoplastic ones such as homo- and copolymers of olefinically unsaturated monomers such as polyfluoroethylene, polyethylene, polypropylene, ethylene/propylene copolymers, polystyrenes, styrene/acrylonitrile copolymers, ABS copolymers (acrylonitrile/butadiene/styrene), vinyl chloride homo- and copolymers, polyacrylates, particularly poylmethylmethacrylate, vinyl acetate copolymers, polyacetals, polycarbonates, particularly polycarbonates based on bisphenol A and bisphenol derivatives, polyesters, polyamides, i.e. known homopolyamides, copolyamides and mixtures of those polyamides. Polyamides and polyesters are preferred and polyamides particularly preferred.

The plastics may contain reinforcing fillers, for example glass fibers, or fillers which give the moldings certain features, for example fillers acting as lubricants or inert fillers such as kaolin or talc. They may further contain many additives such as anti-oxidants, heat or light stabilizers, dyes, pigments or other functional additives. In particular additives in the form of organic and inorganic metal compounds may be contained. These include oxides and sulphides of zinc, oxides and hydroxides of magnesium, copper oxide, iron oxides, metal carbonates such as calcium or magnesium carbonate, talcite or hydrotalcite; borates particularly zinc borate and generally stoichiometric mixtures of metal compounds/oxides. Lanthanides and salts thereof, preferably cerium and substances containing it, salts such as Ce(IV)oxide or $CeO_2$ are also included.

The invention also relates to
  Microencapsulated red phosphorus, wherein the ratio by weight of urea formaldehyde resin to silicon dioxide in the capsule wall is 95:5 to 5:95.
  Microencapsulated red phosphorus, characterized in that, the urea formaldehyde resin is made up of the components urea, formaldehyde, resorcinol and hexamethylenetetramine.
  Microencapsulated red phosphorus, characterized in that, the capsule wall contains a white pigment.

White pigments are substances or mixtures of substances of which the brightening optical effect is generally due to its low light absorption and its pronounced, preferably unselective light scattering capacity. The constitution of the particles and the particle size also effect the white effect.

The inorganic pigments used are predominantly titanium dioxide, zinc oxide, zinc sulphide, barium sulphate, basic lead carbonate, bismuth chloride oxide or also silicas and silicates.

It may also be advantageous to use the pigments in a mixture with further auxiliaries such as calcined kaolin.

The invention also relates to a process for the microencapsulation of red phosphorus in aqueous suspension, which is characterized in that the encapsulating shell of urea formaldehyde resin and silicon dioxide is produced in a one-pot reaction from water-soluble precursors in the presence of red phosphorus dispersed in water and at low pH.

The invention also relates to the use of microencapsulated red phosphorus as flame retardant in plastics materials and plastics blends, thermoplastic materials being preferred.

The invention also relates to:
  molding compositions containing microencapsulated red phosphorus according to the invention.
  molding compositions additionally containing one or more fillers such as glass fibers and/or talcum, glass fibers being particularly preferred.
  molding compositions additionally containing one or more inorganic or organic metal compound, metal salt and/or metal complex.
  molding compositions in which the metal compounds are substances such as metal oxides, metal carbonates, metal hydroxides, metal sulphides, preferably zinc and magnesium salts, wherein zinc oxide, zinc fluoride, zinc sulphide, zinc borate, magnesium oxide and magnesium hydroxide are particularly preferred. Lanthanides and salts thereof are also included, preferably cerium and substances containing them such as Ce(IV) oxide or $CeO_2$. These compounds may also be coated with known media.

The molding compositions according to the invention may further contain one or more additional flame retardants.

Molding compositions characterized in that the additional flame retardants are a melamine compound, preferably melamine, particularly preferably melamine cyanurate and/or an organophosphorus compound and/or a further halogen-free compound are preferred here.

The invention also relates to molded articles made of the molding compositions according to the invention.

The present invention will be further explained by the following examples.

EXAMPLES

Example 1

Microencapsulation of Red Phosphorus 0.62 g of urea, 1.18 g of hexamethylenetetramine and 3.05 g of resorcinol were dissolved in 150 g of water. 30 g of red phosphorus were homogeneously dispersed in this solution while stirring vigorously. 20.7 g of a 37% formaldehyde solution were added to the resulting suspension at 25° C., followed by 18 g of a 35% sodium waterglass solution. Then 12 ml of 85% phosphoric acid were added dropwise over a period of 15 mins, during which the pH value fell to 1. The mixture was then heated to 100° C. for 2 hours. Then the mixture was left to stand overnight, during which the microencapsulated red phosphorus formed precipitated. The phosphorus was filtered off by suction and washed with water until the washing water was neutral. Drying was carried out in a vacuum drying cabinet at 90° C. A powdered, free-flowing product was obtained.

Phosphine Analysis:

116 mg (corresponding to 100 mg of $P_{red}$) of the red phosphorus microencapsulated according to Example 1 were stored for 10 mins at 280° C. and the phosphorus hydride formed was detected.

| Temperature treatment | 280° C./10 mins |
|---|---|
| Released quantity of phosphorus hydride based on microencapsulated red phosphorus | 4 ppm |

COMPARISON EXAMPLE

Microencapsulation of red phosphorus (double encapsulation in 2 stages) according to EP-A 0 195 13.

125 g red phosphorus were suspended in 312.5 ml water. A solution of 10 g $Al_2(SO_4)_3*18H_2O$ in water was added dropwise. After stirring for 10 min at ambient temperature, a pH of 8 was adjusted with a 10% sodium carbonate solution. Ammonium hydroxide was precipitated.

The red phosphorus encapsulated in ammonium hydroxide was suction filtered and then washed with water until the washing water had a pH of 7.

The red phosphorus pre-encapsulated in this way was redispersed with water to a 40 wt. % dispersion. 7.5 g "Seloform MUF 63" (urea melamine phenol formaldehyde resin produced by Chimica Pomponesco S.p.A. of Pomponesco Mantua, Italy) in 11.5 ml water were added dropwise. The mixture was thoroughly homogenised at 80° C. for 30 min by stirring. A solution of 50 mg ammonium chloride as a 10% solution was then added dropwise. Thereafter the mixture was heated to 100° C. for 3 hours and then suction filtered after cooling to ambient temperature. The coated phosphorus was washed with water and then dried in a vacuum drying oven at 50° C.

A powdered free-flowing product was obtained.

For phosphine analysis:

114 mg (corresponding to 100 mg P red) of the red phosphorus encapsulated as directed above were stored for 10 min at 280° C. and the phosphorus hydride formed was detected.

| Temperature treatment | 280° C./10 min |
|---|---|
| Quantity of phosphorus hydride liberated | about 10 ppm |

Example 2

Microencapsulation of Red Phosphorus 1.28 g urea, 2.46 g hexamethylenetetramine and 6.34 g resorcinol were dissolved in 312.5 g water. 125 g red phosphorus with a particle size of 15 to 35 μm were distributed uniformly in this solution using a rapid stirrer. The suspension obtained was mixed with 43.2 g 37% formaldehyde solution and 75 g 35% sodium waterglass solution at 25° C. The pH was then adjusted to 1.5 with 10% sulphuric acid. The mixture was then heated for 6 hours to 100° C. After cooling, the product obtained was filtered, washed free of acid with water and dried at 80° C. The powder obtained was then precipitated in 250 g diphenylether and heated for 2 hours at 150° C. The product was then isolated, washed with alcohol and dried again at 50° C. 149 g powdered free flowing product was obtained.

Example 3

Microencapsulated Red Phosphorus with Light Inherent Color 0.42 g urea, 0.82 g hexamethylenetetramine and 2.12 g resorcinol were dissolved in 330 g water. 20.8 g red phosphorus with an average particle size of 25 μm were distributed homogeneously in this solution with vigorous stirring. The suspension obtained was mixed with 14.4 g 37% formaldehyde solution and 86.5 g of a 6.6% sodium waterglass solution in which 6.3 g titanium dioxide white pigment had been dispersed by means of a bead mill. 76 g 85% phosphoric acid were then added dropwise within 30 min, the pH falling to 1. The mixture was then heated for 2 hours at 100° C. The mixture was subsequently left to stand for 16 h, during which the microencapsulated red phosphorus formed settled. The supernatant liquid was decanted off and the moist product washed with water until the washing water was neutral. Drying was carried out at 50° C. in a vacuum drying oven. 27.5 g of powdered light-colored product was obtained.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A material system comprising encapsulated red phosphorus having a core/shell structure wherein core contains red phosphorus in particulate form and wherein shell contains a combination of urea formaldehyde resin and silicon dioxide the combination produced in a one pot reaction, said urea formaldehyde resin being a water insoluble resin formed by the condensation of urea, formaldehyde, resorcinol and hexamethylenetetramine.

2. The material system of claim 1 wherein the weight of the shell is 1 to 50 wt.%, based on the total weight of the red phosphorus and encapsulating shell.

3. The material system of claim 1 wherein the weight ratio of urea formaldehyde resin to silicon dioxide is 95:5 to 5:95.

4. A method for preparing an encapsulated red phosphorus in a one pot reaction comprising
    (i) obtaining a material system that contains dispersed particulate red phosphorus having a mean particle size of 0.1 to 100 μm in an aqueous phase that comprise urea, formaldehyde and a water-soluble silicon dioxide precursor, said phase having a pH of 6 to 13, and
    (ii) adding to the material system a sufficient amount of acid to lower the pH to 0 to 5 and to obtains an acidic system,
    (iii) maintaining the acidic system at a temperature of 80 to 120° C. for a period longer than one hour.

5. The encapsulated red phosphorus prepared by the method of claim 4.

6. A method of using the red phosphorus of claim 5 comprising incorporating the red phosphorus as flame retardant in plastics materials.

7. A molding composition containing the encapsulated red phosphorus of claim 5.

8. The molding composition of claim 7 further containing one or more members selected from the group consisting of glass fibers and talcum.

9. The molding composition of claim 7 further containing one or more members selected from the group consisting of inorganic and organic metal compound, metal salt and metal complex.

10. The molding composition of claim 7 further containing one or more additional flame retardant.

11. A molded article comprising the molding composition of claim 7.

* * * * *